United States Patent [19]

Kokuga

[11] Patent Number: 5,554,920
[45] Date of Patent: Sep. 10, 1996

[54] RECHARGEABLE BATTERY CHARGING METHOD

[75] Inventor: Toshiharu Kokuga, Sumoto, Japan

[73] Assignee: Sanyo Electric Co., Ltd., Osaka, Japan

[21] Appl. No.: 310,055

[22] Filed: Sep. 22, 1994

[30] Foreign Application Priority Data

Sep. 30, 1993 [JP] Japan .................... 5-244758

[51] Int. Cl.⁶ ............................................ H01M 10/44
[52] U.S. Cl. .................................. 320/22; 320/31
[58] Field of Search ........................ 320/20, 21, 22, 320/30, 31, 37, 35

[56] References Cited

U.S. PATENT DOCUMENTS

| | | | |
|---|---|---|---|
| 5,206,579 | 4/1993 | Kawate et al. | 320/31 X |
| 5,237,259 | 8/1993 | Sanpei | 320/31 X |
| 5,311,113 | 5/1994 | Kojima | 320/20 |
| 5,350,995 | 9/1994 | Iketani | 320/20 X |

FOREIGN PATENT DOCUMENTS 1-177834   7/1989   Japan .

*Primary Examiner*—Peter S. Wong
*Assistant Examiner*—Edward Tso
*Attorney, Agent, or Firm*—Wenderoth, Lind & Ponack

[57] ABSTRACT

A rechargeable battery is supplementary charged after peak battery voltage is detected. The time interval for supplementary charging is variable and set as a function of the time to peak voltage or charging current. The longer the charging time or the higher the charging current, the longer the supplementary charging timer interval.

26 Claims, 6 Drawing Sheets

RECHARGEABLE BATTERY CHARGING METHOD

BACKGROUND OF THE INVENTION

The present invention relates primarily to a method of charging nickel cadmium and nickel hydrogen rechargeable batteries.

The $-\Delta V$ detection method, where rapid charging is stopped when a small voltage drop from the peak battery voltage is detected, is adopted as a charging method for the nickel cadmium battery. This method utilizes the property shown in FIG. 1 that battery voltage drops by a voltage $-\Delta V$ from its peak value when the battery becomes fully charged. This method has the weak point that the rechargeable battery can be over-charged when $-\Delta V$ cannot be detected normally. $-\Delta V$ is difficult to detect when charging current is small with only gradual changes in battery voltage, when battery temperature is low, and when nickel hydrogen batteries are charged. When $-\Delta V$ cannot be detected and the battery is over-charged, not only is rechargeable battery performance reduced, but there is also the danger of explosion due to gas pressure build-up within the ease.

To overcome this problem, a method of detecting peak voltage instead of $-\Delta V$ is recited in Japanese Non-examined Patent Publication No. 1-177834 issued Jul. 14, 1989. In this disclosure, the rechargeable battery is fully charged by supplementary charging for a set time interval determined by a supplementary charging timer after peak voltage has been detected. This is done because the rechargeable battery has not reached full charge when the peak voltage is detected.

However, when charging conditions differ, it is difficult to charge all rechargeable batteries to full charge without over-charging using a method that detects peak battery voltage during charging and then performs supplementary charging for a fixed interval. This is because rechargeable batteries under different charging conditions will have different charging capacities at the peak voltage detection point.

For example, when rechargeable batteries with different residual battery capacities are charged, they will have different charging capacities at the peak voltage detection point. A completely discharged rechargeable battery that is charged until it reaches peak voltage, will still not be near full charge. On the other hand, a battery near full charge that is charged until it reaches peak voltage, will be in a state close to full charge. Consequently, it is difficult to set the supplementary charging time interval after the peak battery voltage for a method with a fixed supplementary charging interval. If the supplementary charging time interval is set to fully charge a completely discharged battery, a rechargeable battery near full charge will be over-charged. However, if the supplementary charging time interval is reduced to avoid over-charging a battery near full charge, a completely discharged battery will not be fully charged.

Further, rechargeable battery voltage characteristics during charging vary according to the charging current as well as battery capacity. If the rechargeable battery is charged with a large charging current, the peak voltage value will be detected early, and if the charging current is reduced, the peak voltage value will be detected late. Therefore, a battery charged by a small charging current will be in a state close to full charge when the peak battery voltage is detected. However, a battery charged by a large charging current will not be close to full charge when the peak battery voltage is detected. Consequently, as described previously, when supplementary charging is performed for a fixed timer interval after peak voltage detection, all rechargeable batteries cannot be fully charged without over-charging.

The present invention was developed to overcome the above mentioned disadvantages. It is thus a primary object of the present invention to provide a rechargeable battery charging method that can fully charge a rechargeable battery under various charging conditions without over-charging.

SUMMARY OF THE INVENTION

The rechargeable battery charging method of this invention achieves the above object by charging a battery in the following manner. The supplementary charging timer setting in this method is improved over prior art supplementary charging methods.

The charging method of the present invention is characterized by adjusting the supplementary charging timer setting to an optimum time as a function of charging conditions to achieve full charge and prevent over-charging under various charging conditions. The supplementary charging timer is set as a function of the charging time from the start of charging until peak voltage detection. In addition, the supplementary charging timer may be set as a function of the charging current.

In the method of adjusting the supplementary charging timer setting according to the charging time as shown in FIG. 2, as the charging time to peak voltage detection increases, the supplementary charging timer setting increases. For example, in this ease the supplementary charging timer setting is the charging time to peak voltage detection times a constant.

It is also not necessary for the supplementary charging timer setting to vary continuously. As shown in FIG. 3, the supplementary charging timer interval can, for example, have the discrete values of 0 or 3 min. In this ease, if the charging time is less than a specified time Ta, the timer setting is 0, and if it is greater than Ta, the timer is set to 3 min. Further, as shown in FIG. 4, the supplementary charging timer interval can be 0 for a charging time less than Ta, and increase with increasing charging time for times greater than Ta. Still further, as shown in FIG. 5, the supplementary charging timer interval Tb can be 0 for a charging time less than a specified time Ta, suddenly step up to a longer time interval when Ta is exceeded, and subsequently increase with a constant slope.

For the case where the supplementary charging timer interval is varied according to rechargeable battery charging current as shown in FIG. 6, when charging current is large the timer interval is made longer, and when charging current is small the timer interval is made shorter. This is because peak voltage appears soon for large charging currents, and considerable additional charging is required before full charge is reached. On the other hand, for small charging currents the battery is in a state close to full charge when the peak voltage is reached.

In the rechargeable battery charging method of the present invention, the supplementary charging time after reaching peak voltage is varied depending on the charging time to peak voltage or the charging current. A battery that takes a short time from the start of charging to the peak voltage, is close to full charge. If this battery is supplementary charged for a long period after reaching peak voltage, there is a danger of over-charging. The present invention avoids over-charging by shortening the the supplementary charging timer setting for batteries with a short charging time. On the other hand, a completely discharged battery will not be near full charge even after charging to peak voltage. The present invention fully charges batteries taking a long time to charge by lengthening the the supplementary charging time.

In addition, the present invention adjusts supplementary charging time according to charging current. A battery charged by a small current will be in a state close to full charge when peak voltage is reached. The present invention avoids over-charging a battery charged to peak voltage by a small charging current by shortening the supplementary charging time. On the other hand, supplementary charging time is lengthened to fully charge a battery charged to peak voltage by a large charging current.

As described above, the rechargeable battery charging method of the present invention has the characteristic that a battery can be fully charged under various conditions without overcharging. This is because the supplementary charging time after reaching peak voltage is adjusted to an optimum value based on charging conditions. Prior art methods of supplementary charging after peak voltage detection have the disadvantage that if supplementary charging time is set long to fully charge a completely discharged battery, charging a battery near full charge results in over-charging and battery performance degradation. If the supplementary charging time is set short to prevent over-charging a battery near full charge, it is difficult to fully charge a completely discharged battery and the actual usable battery capacity is reduced. This is because the supplementary charging time is fixed. The charging method of the present invention has the characteristic that it can both prevent over-charging a fully charged battery and fully charge a completely discharged battery because the supplementary charging timer setting is optimally adjusted according to charging conditions. Supplementary charging time can be set short for a fully charged battery and set long for a completely discharged battery. Consequently, the charging method of the present invention has the characteristic that it can lengthen battery lifetime by preventing performance degradation due to over-charging, and it can improve effective battery utilization.

DETAILED DESCRIPTION OF THE INVENTION

An embodiment of the present invention is described in the following based on the illustrations. However, the following embodiment is intended only as a concrete example of the technical concepts of the charging method of the present invention and the rechargeable battery charging method and charging circuit of this invention is in no way specified or limited to that described in the following. Further, the following embodiment gives an example of a charging method for nickel-cadmium and nickel-hydrogen batteries. However, the present invention does not specify or limit the type of battery to be charged. This method can be used for any battery that reaches a voltage peak as full charge is approached.

Figure 7:
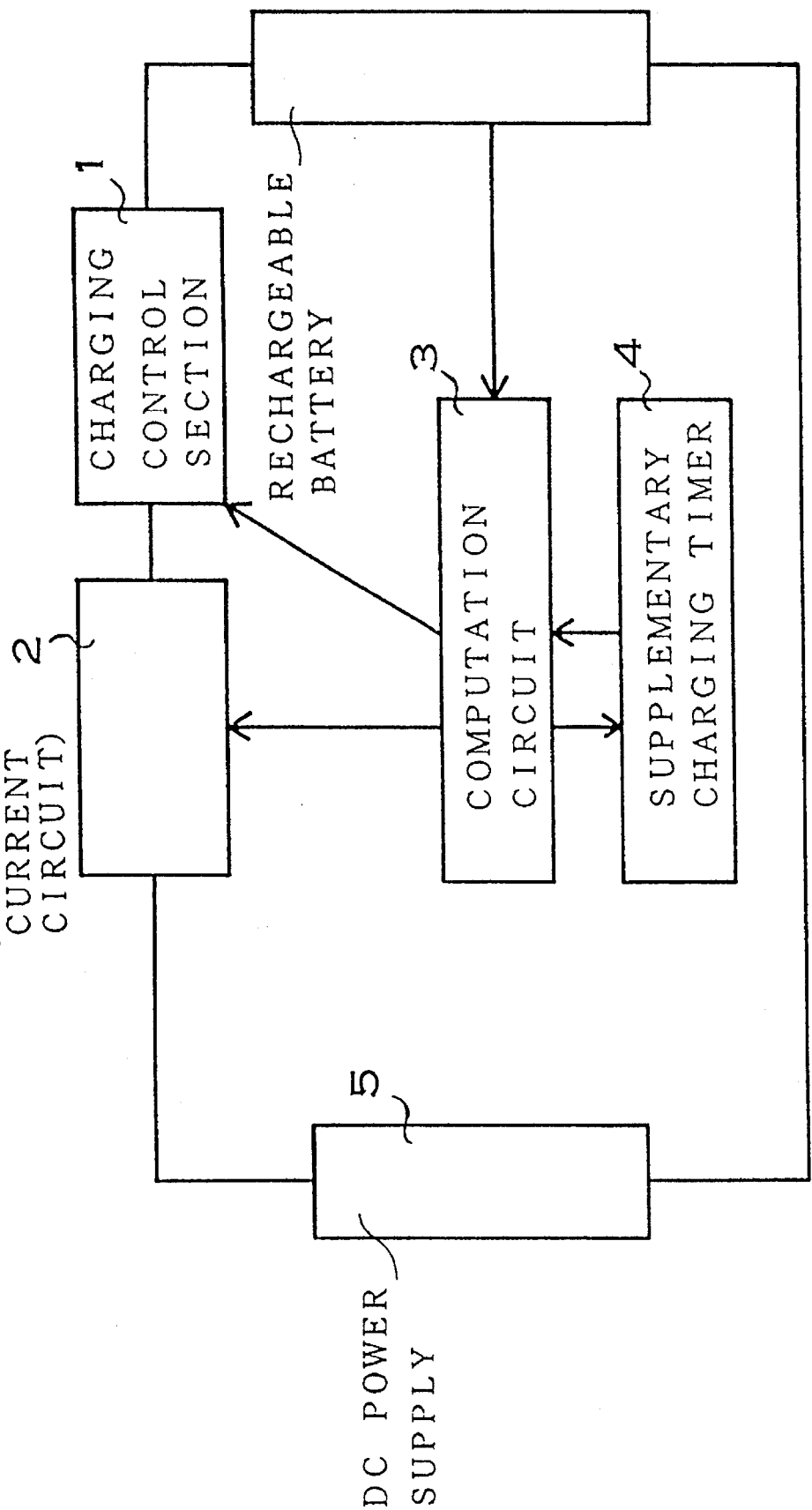
FIG. 7 is a circuit diagram showing an example of a charging circuit used in the charging method of the present invention.

Turning to FIG. 7, a charging circuit used by the charging method of the present invention is shown. The charging circuit shown in this figure is provided with a charging control section 1 to end charging when the battery is fully charged, a current control section 2 to regulate charging current, a computation circuit 3 to detect battery voltage and control both the charging control section 1 and the current control section 2, a supplementary charging timer 4 to perform supplementary charging after peak battery voltage is reached, and a DC power supply 5 to produce DC voltage capable of charging the rechargeable battery.

The charging control section 1 performs trickle charging after rapid charging of the rechargeable battery, and it contains a switching device (not illustrated) that stops charging. The switching device is controlled on during rechargeable battery charging and off when the battery has reached full charge.

The current control section 2 controls the charging current to the rechargeable battery. The rechargeable battery is charged with a large constant current during rapid charging. A rapid charging current of 0.5 C to 3 C can be supplied, but a charging current of 1 C to 2 C is preferable. In the charging method of the present invention, rapid charging with a constant current is performed until peak battery voltage is reached. When peak voltage is reached, supplementary charging is performed at the same current used for rapid charging. However, the charging current during supplementary charging may be set slightly lower than the rapid charging current used prior to peak battery voltage and higher than the trickle charging current. The current control section 2 trickle charges the battery to full charge after rapid charging. The trickle charging current is preferably set at or below one tenth of the rapid charging current.

Figure 8:
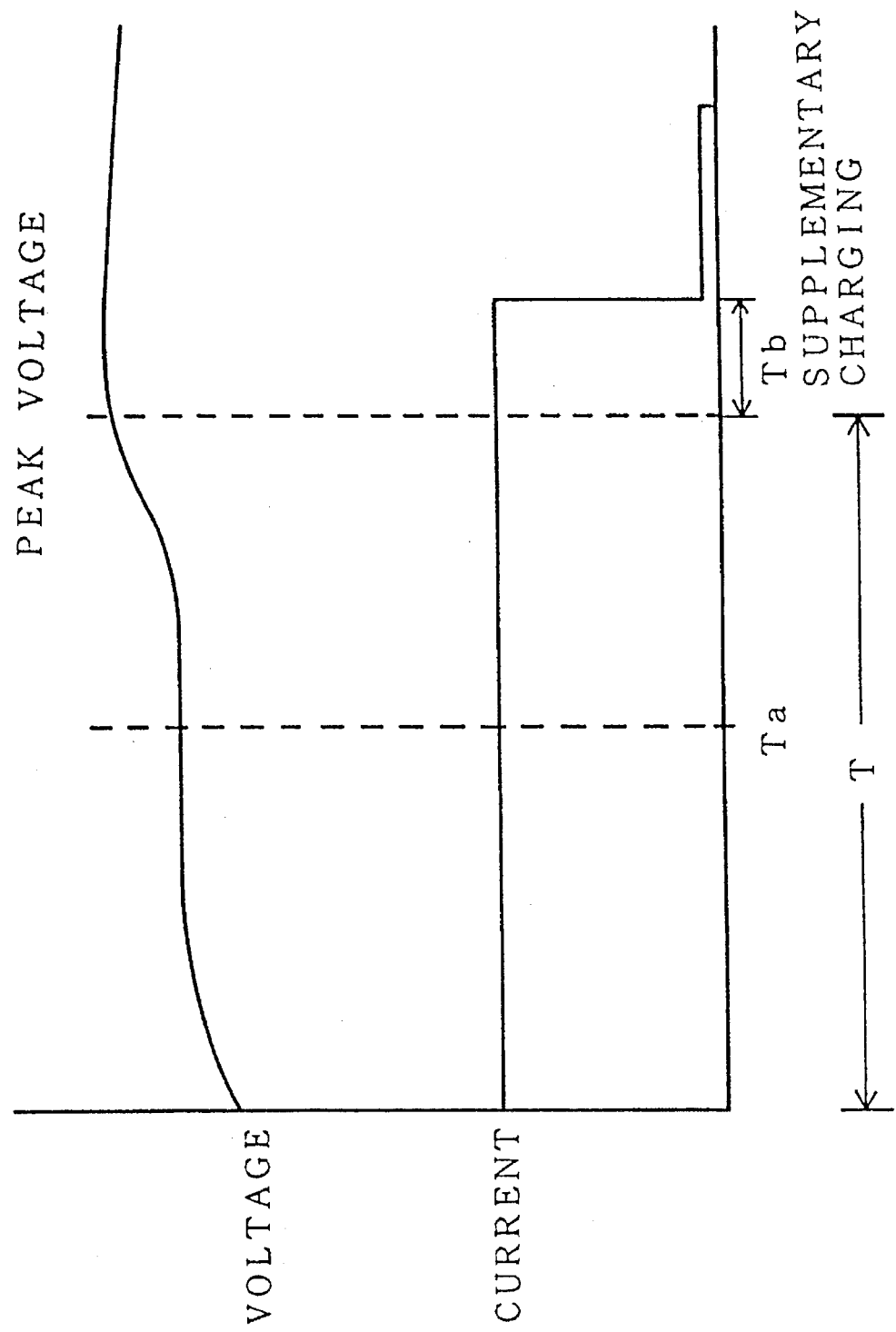
FIG. 8 is a graph showing the voltage and current characteristics for charging a rechargeable battery by the method of the present invention.

The computation circuit 3 controls battery charging current as shown by the graph of FIG. 8. The computation circuit 3 computes and sets the supplementary charging timer 4 interval Tb when the battery charges to its peak voltage, switches from rapid charging to trickle charging when the supplementary charging time is up, and stops charging when trickle charging is complete. The computation circuit 3 has the function Tb=f(T) or Tb=f(I) stored in memory to calculate the supplementary charging timer 4 setting Tb from the charging time to peak voltage T or the charging current I. A function for calculating the supplementary charging timer 4 setting based on the charging time can be given, for example, by the following equation.

$Tb = k \times T$

Figure 1:
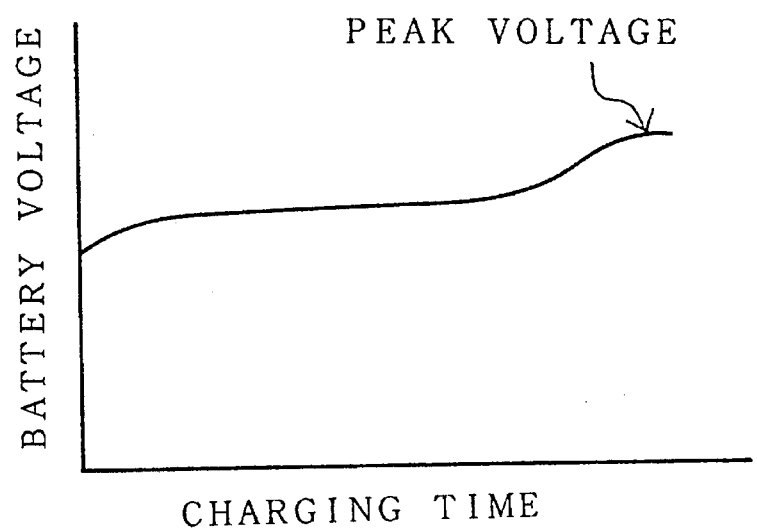
FIG. 1 is a graph showing the voltage characteristic of a nickel-cadmium battery during charging.
Figure 2:
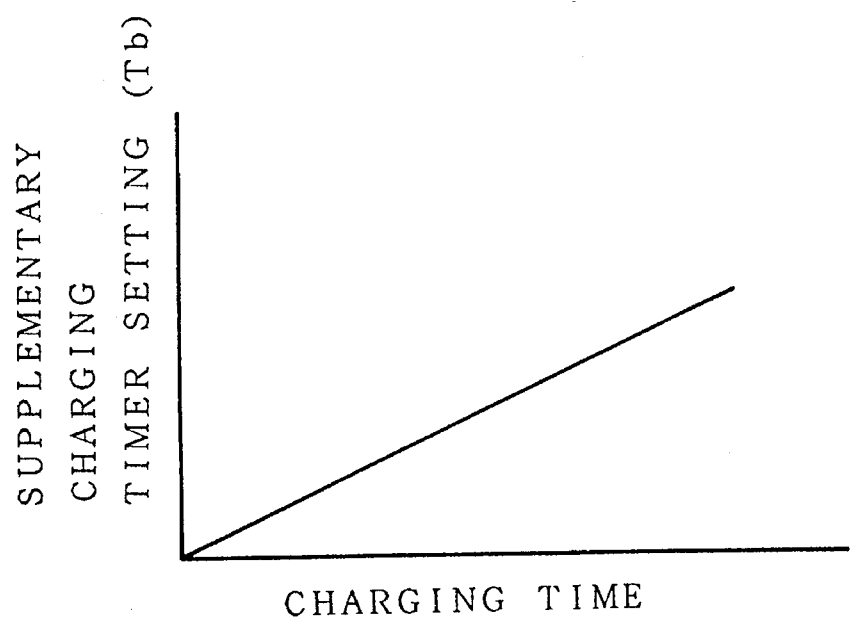
FIG. 2 is a graph showing a function for computing the supplementary charging timer setting in the charging method of the present invention.

Here, k is a constant, for example, between 0.03 and 0.2, and preferably set approximately equal to 0.1. As shown in FIG. 2, the supplementary charging timer 4 interval increases in proportion to the charging time T when the computation circuit 3 uses this function to compute the supplementary charging timer 4 setting.

Figure 3:
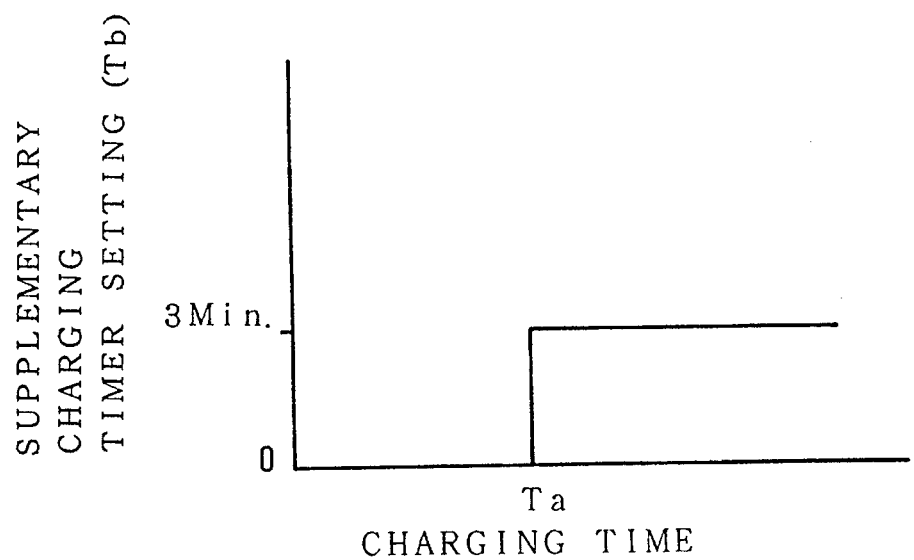
FIG. 3 is a graph showing a function for computing the supplementary charging timer setting in the charging method of the present invention.
Figure 4:
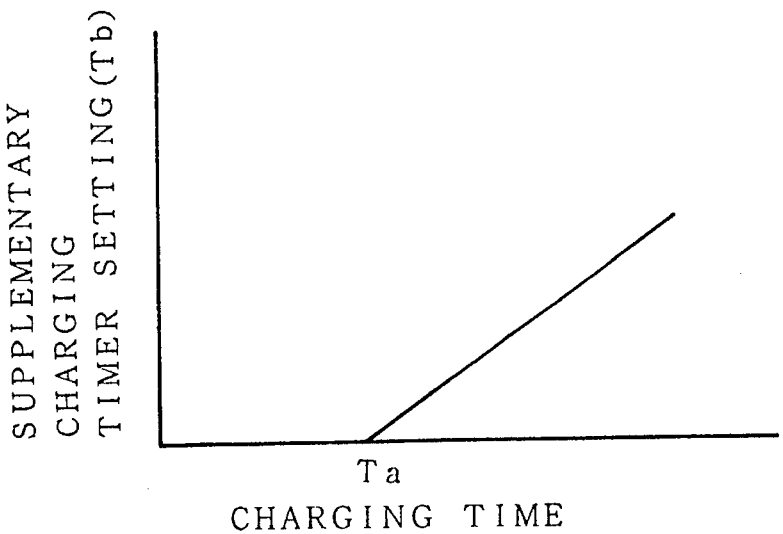
FIG. 4 is a graph showing a function for computing the supplementary charging timer setting in the charging method of the present invention.
Figure 5:
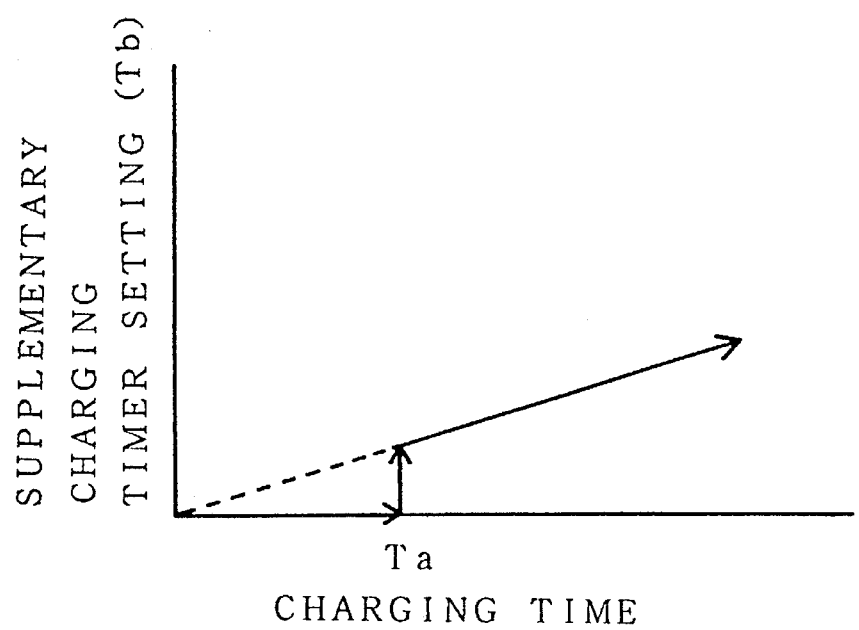
FIG. 5 is a graph showing a function for computing the supplementary charging timer setting in the charging method of the present invention.
Figure 6:
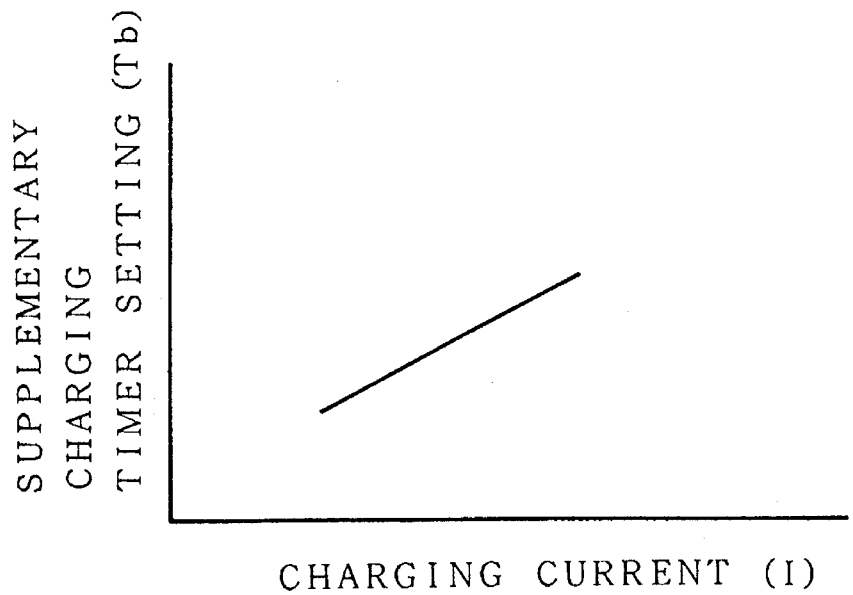
FIG. 6 is a graph showing a function for computing the supplementary charging timer setting in the charging method of the present invention.

However, the supplementary charging timer 4 setting can also be calculated by the computation circuit 3 as shown in FIG. 3 through FIG. 6. Turning to FIG. 3, the supplementary charging timer 4 is set to 0 or 3 min. depending on whether charging time is shorter or longer than a specified time Ta stored in computation circuit 3 memory. Turning to FIG. 4, when charging time is shorter than the specified time Ta, the supplementary charging timer 4 is set to 0, and when it is longer than Ta, the timer setting is increased gradually. Turning to FIG. 5, when charging time is shorter than the specified time Ta, the supplementary charging timer 4 is set to 0, but when Ta is exceeded, the timer interval Tb is set proportional to the charging time. Finally turning to FIG. 6, the supplementary charging timer 4 interval Tb can also be increased depending on the charging current to the rechargeable battery.

The time interval Tb is calculated by the computation circuit 3 for the supplementary charging timer 4. When the time interval Tb is up, the supplementary charging timer 4 inputs a time-up signal to the computation circuit 3 and the computation circuit 3 switches from rapid charging to trickle charging.

Figure 9:
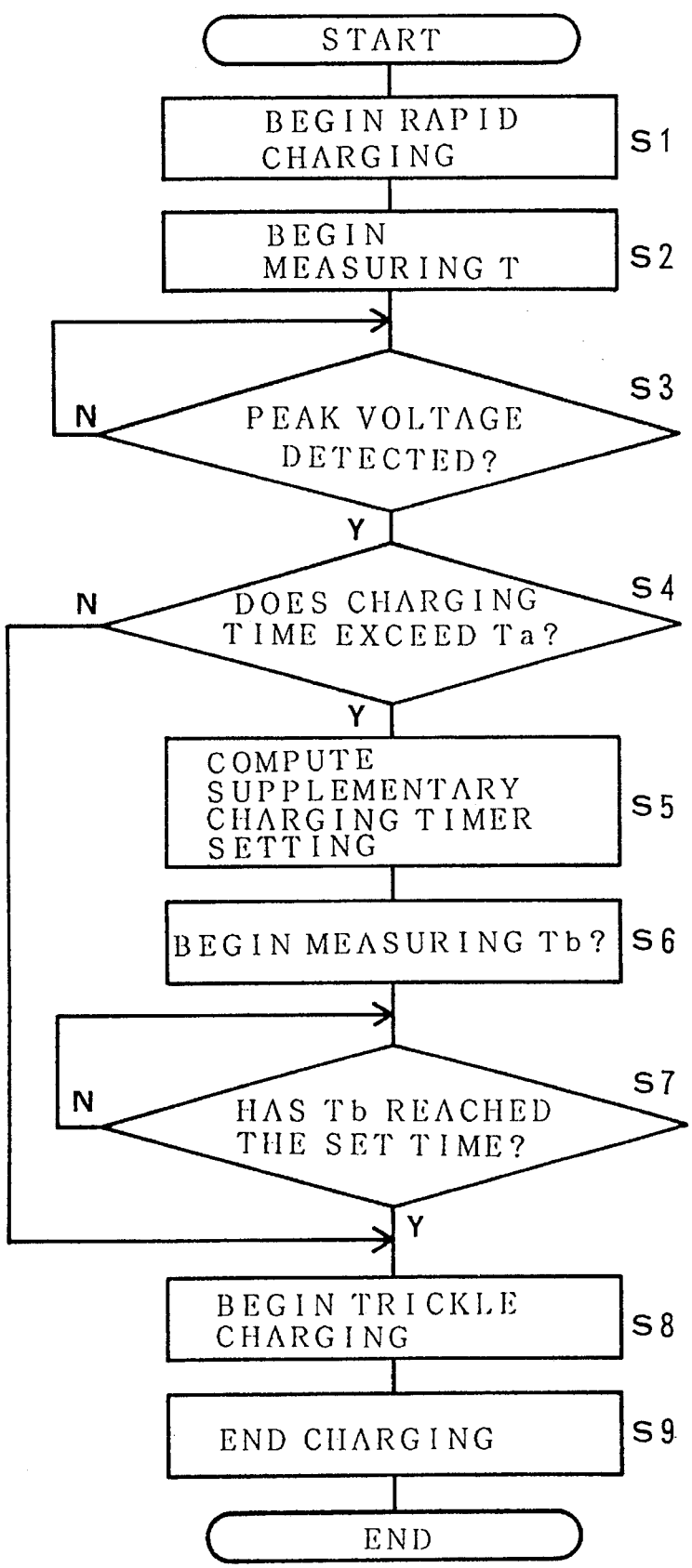
FIG. 9 is a flow-chart for charging a rechargeable battery with the charging circuit shown in FIG. 7.

A rechargeable battery is charged by the charging circuit shown in FIG. 7 according to the flow-chart of FIG. 9 in the following manner.

(1) Begin rapid charging. At this time the computation circuit 3 turns the switching device of the charging control section 1 on and controls the current control section 2 to supply rapid charging current for the rechargeable battery. [S1].

(2) Begin measuring charging time T after charging is started. [S2].

(3) The computation circuit 3 determines whether or not the rechargeable battery peak voltage has been detected. Loop at this step as long as the peak voltage has not been detected. [S3].

(4) When peak voltage has been detected, the charging time T is compared to the specified time Ta stored in memory in the computation circuit 3. If the charging time T does not exceed the specified time Ta, control jumps to step 8 and trickle charging of the rechargeable battery is started. [S4].

(5) If the charging time T exceeds the specified time Ta, the computation circuit 3 calculates the supplementary charging timer 4 setting Tb from the charging time. [S5].

(6) The supplementary charging timer 4 begins counting. [S6].

(7) The supplementary charging timer 4 determines whether the set time interval Tb has elapsed or not and loops at this step until Tb has elapsed. [S7].

(8) When the supplementary charging timer 4 interval Tb has elapsed, the computation circuit 3 controls the current control section 2 to switch from rapid charging to trickle charging. [S8].

(9) The computation circuit 3 times the trickle charging and controls the charging control section 1 to end charging when a specified time has elapsed. [S9].

After peak voltage has been reached, this charging method performs trickle charging rather than rapid charging when the charging time from the start to peak voltage is shorter than the specified time Ta stored in computation circuit 3 memory. In this charging method, the computation circuit 3 calculates the supplementary charging timer 4 interval as shown in FIG. 5. It is also possible for the computation circuit 3 to calculate the supplementary charging timer 4 interval by the functions shown in FIG. 2 through FIG. 4 and FIG. 6.

In the charging method of the present invention, when peak voltage is not detected after rapid charging for a given time interval, it is also possible to increase the rapid charging current. By increasing the charging current battery voltage peaking is made clearer. For example, when a rechargeable battery is rapidly charged with 1 C, peak voltage is detected within one hour. However, in case peak voltage is not detected in one hour, the rapid charging current can be increased to make the peak voltage easier to detect. After peak voltage is detected, supplementary charging is performed and finally trickle charging is switched to.

Further, rechargeable battery charging capacity at peak voltage detection varies depending on battery temperature during charging. When a rechargeable battery is rapidly charged at low temperature, considerable charging is required to reach full charge even after peak voltage detection. Therefore, a rechargeable battery can be fully charged regardless of temperature if battery temperature is measured and the supplementary charging timer setting is lengthened for low temperatures and shortened for high temperatures.

Finally, for a battery where peak voltage is detected after a charging time less than the specified time Ta, rapid charging is shifted to trickle charging. For a battery where peak voltage is detected after time Ta has been exceeded, it is also possible to continue rapid charging until x∆V is detected then stop rapid charging and perform trickle charging.

In the previously described charging methods, the rechargeable battery is trickle charged to full charge after rapid charging. However, in the rechargeable battery charging method of the present invention it is not always necessary to perform trickle charging after rapid charging. It is possible to end charging after rapid charging without trickle charging.

What is claimed is:

1. A rechargeable battery charging method wherein:
   (a) charging the rechargeable battery until a peak battery voltage of the rechargeable battery is detected;
   (b) measuring a charging time from the start of charging until detection of the peak battery voltage;
   (c) computing a supplementary charging time interval according to the charging time; and
   (d) performing supplementary charging of the rechargeable battery for the supplementary charging time interval after detection of the peak battery voltage.

2. A rechargeable battery charging method as recited in claim 1 wherein the rechargeable battery is charged by a constant charging current until the peak battery voltage is detected.

3. A rechargeable battery charging method as recited in claim 2 wherein the constant charging current is from 0.5 C to 3 C.

4. A rechargeable battery charging method as recited in claim 3 wherein the constant charging current is from 1 C to 2 C.

5. A rechargeable battery charging method as recited in claim 1 wherein the constant charging current is increased when the peak battery voltage cannot be detected during charging.

6. A rechargeable battery charging method as recited in claim 1 wherein the charging current for supplementary charging is set equal to the charging current for rechargeable battery charging to peak voltage detection.

7. A rechargeable battery charging method as recited in claim 1 wherein the charging current for supplementary charging is set less than the charging current for rechargeable battery charging to peak voltage detection.

8. A rechargeable battery charging method as recited in claim 1 wherein the rechargeable battery is trickle charged after supplementary charging.

9. A rechargeable battery charging method as recited in claim 8 wherein the charging current for supplementary charging is set less than the charging current for rechargeable battery charging to peak voltage detection and greater than the charging current for trickle charging.

10. A rechargeable battery charging method as recited in claim 8 wherein the charging current for trickle charging is set to one tenth the charging current for rechargeable battery charging to peak voltage detection.

11. A rechargeable battery charging method as recited in claim 1 wherein the supplementary charging time interval is set equal to a constant multiplied by the charging time.

12. A rechargeable battery charging method as recited in claim 1 wherein the supplementary charging time interval is zero when the charging time to peak voltage detection is less than a specified predetermined time, and a constant time interval when charging time is greater than the specified time.

13. A rechargeable battery charging method as recited in claim 1 wherein the supplementary charging time interval is zero when the charging time to peak voltage detection is less than a specified predetermined time, and is set progressively longer as the charging time increases beyond the specified time.

14. A rechargeable battery charging method as recited in claim 1 wherein the temperature of the rechargeable battery being charged is measured, and the supplementary charging time interval is increased when the temperature is low and decreased when the temperature is high.

15. A rechargeable battery charging method wherein:
(a) charging the rechargeable battery until a peak battery voltage of the rechargeable battery is detected;
(b) measuring a charging current from the start of charging until detection of the peak battery voltage;
(c) computing a supplementary charging time interval according to the charging current; and
(d) performing supplementary charging of the rechargeable battery for the supplementary charging time interval after detection of the peak battery voltage.

16. A rechargeable battery charging method as recited in claim 15 wherein the rechargeable battery is charged by a constant charging current until the peak battery voltage is detected.

17. A rechargeable battery charging method as recited in claim 16 wherein the constant charging current is from 0.5 C to 3 C.

18. A rechargeable battery charging method as recited in claim 17 wherein the constant charging current is from 1 C to 2 C.

19. A rechargeable battery charging method as recited in claim 15 wherein the constant charging current is increased when the peak battery voltage cannot be detected during charging.

20. A rechargeable battery charging method as recited in claim 15 wherein the charging current for supplementary charging is set equal to the charging current for rechargeable battery charging to peak voltage detection.

21. A rechargeable battery charging method as recited in claim 15 wherein the charging current for supplementary charging is set less than the charging current for rechargeable battery charging to peak voltage detection.

22. A rechargeable battery charging method as recited in claim 15 wherein the rechargeable battery is trickle charged after supplementary charging.

23. A rechargeable battery charging method as recited in claim 22 wherein the charging current for supplementary charging is set less than the charging current for rechargeable battery charging to peak voltage detection and greater than the charging current for trickle charging.

24. A rechargeable battery charging method as recited in claim 22 wherein the charging current for trickle charging is set to one tenth the charging current for rechargeable battery charging to peak voltage detection.

25. A rechargeable battery charging method as recited in claim 15 wherein the supplementary charging time interval is set continuously longer as the charging current during charging to peak voltage detection increases.

26. A rechargeable battery charging method as recited in claim 15 wherein the temperature of the rechargeable battery being charged is measured, and the supplementary charging time interval is increased when the temperature is low and decreased when the temperature is high.

\* \* \* \* \*